United States Patent [19]

Hill

[11] 3,942,609

[45] Mar. 9, 1976

[54] SAFETY BRAKE FOR BICYCLES

[76] Inventor: Robert H. Hill, 5808 E. 64th St., Tulsa, Okla. 74136

[22] Filed: Apr. 14, 1975

[21] Appl. No.: 567,754

[52] U.S. Cl. ................................................. 188/24
[51] Int. Cl.² .......................................... B62L 3/08
[58] Field of Search ........ 188/2 D, 24, 26, 27, 71.1, 188/72.1, 204 R, 217

[56] References Cited

UNITED STATES PATENTS

| | | | |
|---|---|---|---|
| 1,674,751 | 6/1928 | Von Luettwitz | 188/2 D |
| 3,782,507 | 1/1974 | Shreve | 188/2 D |

FOREIGN PATENTS OR APPLICATIONS

| | | | |
|---|---|---|---|
| 369,929 | 12/1920 | Germany | 188/204 R |
| 658,224 | 6/1929 | France | 188/2 D |
| 907,527 | 3/1946 | France | 188/24 |

*Primary Examiner*—Trygve M. Blix
*Assistant Examiner*—Edward R. Kazenske
*Attorney, Agent, or Firm*—Head, Johnson, and Chafin

[57] ABSTRACT

An apparatus for use on bicycles having a front brake, a rear brake, a left hand brake lever and a right hand brake lever wherein, regardless of whether the left or right hand brake lever is actuated, or both brake levers simultaneously, the rear brake of the bicycle is preferentially actuated such that the rear brake is applied first and with more force than the front brake. The apparatus includes a housing for mounting on the bicycle, a front brake actuator connected to a cable extending to the front brake and a rear brake actuator connected to a cable extending to the rear brake one of the actuators having two pulleys thereon, each of the cables from the brake levers looping around the pulleys and attaching to the other brake actuator, and including a spring applying a bias to resist the movements of the front brake actuator.

5 Claims, 7 Drawing Figures

SAFETY BRAKE FOR BICYCLES

BACKGROUND, SUMMARY AND OBJECTS OF THE INVENTION

Most multi-speed bicycles manufactured today include, for safety purposes, individual front and rear brakes. The brakes are typically of the caliper type, that is, a type which, when actuated, squeeze two brake pads against opposed peripheral surfaces of the rim. Usually, such bicycles have a brake lever on both the left and the right ends of the handlebar with the left lever applying one of the brakes and the right lever the other. The use of separate brakes and separate actuating means for bicycles is a safety feature since if one of the brakes fail the other brake is available for stopping the bicycle. A problem exists, however, if the bicycle is moving at a fast rate of speed and the front brake is applied vigorously, there is a tendency for the bicycle to go out of control. An experienced operator using presence of mind, will always apply the rear brake first and then the front brake second if needed and with less force so that the front brake is applied only after the major braking effect is achieved by the rear brake. If the front brake is applied with sufficient force that the front wheel is locked, all guiding effect of the front wheel is lost and the bicycle can easily go out of control. As long as the front wheel is permitted to turn, even though with some braking restraint, guiding effect is achieved.

This invention is directed toward a device for use with the bicycle having front and rear brakes and left and right brake levers to provide an arrangement wherein the rear brake is always preferentially applied regardless of whether the user applies the left or right hand lever first or the levers simultaneously.

It is therefore an object of this invention to provide a safety brake device for a bicycle.

More particularly, an object of this invention is to provide a safety brake device for bicycles having front and rear brakes and left and right hand brake levers including an arrangement wherein the rear brake is preferentially applied regardless of which brake brake device is first including Still more particularly, an object of this invention is to provide a safety brake for bicycles incuding a housing for mounting on the frame of a bicycle, having a front brake cable and a rear brake cable extending therefrom, and having left and right hand lever cables extending therefrom, and including a front and rear brake actuator supported within the housing, the actuator arranged in such a way that the rear brake actuator is moved to apply pressure by way of the rear brake cable preferentially to the movement of the front brake actuator.

These general objects, as well as other and more specific objects, will be fulfilled in the following description and claims, taken in conjunction with the attached drawings.

DESCRIPTION OF VIEWS

DETAILED DESCRIPTION

Figure 1:
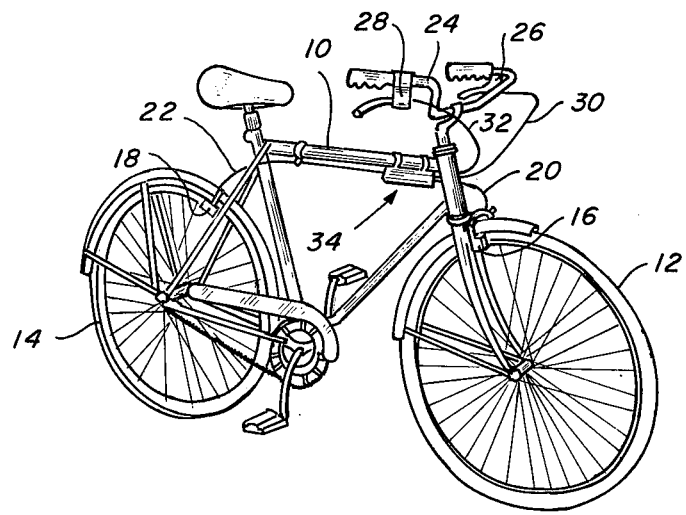
FIG. 1 is an isometric view of a typical bicycle having front and rear brakes and left and right hand lever, and with the mechanism of this invention mounted thereon.

Referring to the drawings and first to FIG. 1, a typical bicycle having front and rear brakes is illustrated. The bicycle includes a frame 10, a front wheel 12 and a rear wheel 14. Supported to the front portion of the frame is a caliper type mechanism 16 and, in like manner, supported to the rear portion of the frame is a rear caliper brake mechanism 18. A front brake cable 20 extends from the front brake 16 and the brake is arranged such that when the interior portion of cable 20 is withdrawn the front brake 16 is applied. Typically, the brakes 16 and 18 are of the type having pressure pads (not shown in detail) to each side of the rim of the wheels 12 and 14 with a cable in the form of an outer shield with an inner cable portion. When the inner cable portion is withdrawn relative to the outer shield the brake 16 is applied. In the same manner a rear brake cable 22 actuates the rear brake 18.

The bicycle handlebars 24 have a left hand lever 26 and a right lever 28. Extending from the left lever 26 is a left lever cable 30 and in like manner, extending from the right lever 28 is a right lever cable 32. In the normal arrangement for bicycles in present use, each of the levers 26, 28 controls individually one of the brakes 16 or 18. For instance, the left lever 26 may be used to control the rear brake 18. In this existing type arrangement the cables 20 and 30 would be the same cable and cables 22 and 32 would be the same.

Figure 2:
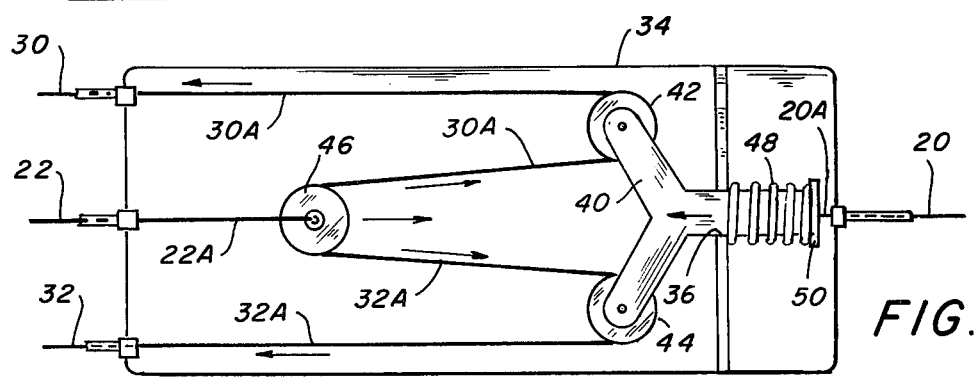
FIG. 2 is a view of a housing portion having the cover removed showing the mechanism inside and the cables extending to the brakes and levers.

This invention utilizes a safety device, generally indicated by the numeral 34, fastened to the frame of bicycle 10. The safety device 34 is in the form of a housing, FIG. 2 showing one embodiment of the device with the housing cover removed. Extending to the housing is the front brake cable 20, the rear brake cable 22, the left lever cable 30 and the right cable 32. Each cable has an inner portion which moves relative to the outer portion, the inner portions being designated by the numerals 20A, 30A and 32A.

Slidably mounted through an opening 36 in a partition 38 in the housing 34 is a front brake actuator 40. Supported to the actuator 40 is a first rotatably mounted pulley 42 and a second rotatably mounted pulley 44. Affixed to the inner end of the rear brake cable 22A is a rear brake pulley 46. The left lever cable 30A loops around the pulley 42 and around the rear brake pulley 46. In like manner, the right lever cable 32A loops around pulley 44. The cables 30A and 32A join together and, in the embodiment of FIG. 2, may be formed of one continuous cable.

OPERATION OF THE FIRST EMBODIMENT

In the embodiment of FIG. 2, when the left hand lever 26 is actuated by the bicycle operator, the left lever cable 30A is withdrawn in the direction indicated by the arrow. This movement is transposed around pulley 42, the cable moving in a direction indicated by the arrow. Since cable 32A is not extended, pulley 46 is pulled in the direction indicated by the arrow to withdraw rear brake cable 22A and thereby the rear brake is applied. If the right hand lever 28 is actuated, cable 32A is withdrawn also in the direction indicated by the arrows, moving rear brake pulley 46 in the direction indicated by the arrow, withdrawing rear brake cable 22A and applying the rear brake. Thus, whether the left or right hand lever is actuated the rear brake is applied. The same thing applies if both the hand levers are partially actuated simultaneously. When the movement of either cable 30A and 32A is beyond the maximum limit permitted by the movement of cable 22A, that is, when cable 22A has been withdrawn to the extent that the rear brake is fully applied, pulley 46 can no longer advance. Thus, further movement of either cable 30A or 32A will cause the front brake actuator 40 to move in the direction indicated by the arrow. This movement, however, is against the force of compression spring 48 which is positioned between the housing partition 38 and a flange 50 on the outer end of the actuator. As the force of spring 48 is overcome the front brake cable 20A is withdrawn, applying the front brakes 16. Thus it can be seen that whether the left or right hand lever is first applied or both applied simultaneously and only partially, the rear brake is preferentially applied. Further lever effort, either by the right or left hand lever, or by both, will, after the rear brake has been fully applied, apply the front brake. In this way, the operator always applies the rear brake first and primarily, and the front brake is applied only as additional braking is required.

The amount of preference given to the rear brake is determined by the compression of spring 48. It can be seen that this could be made adjustable.

OTHER EMBODIMENTS

Figure 3:
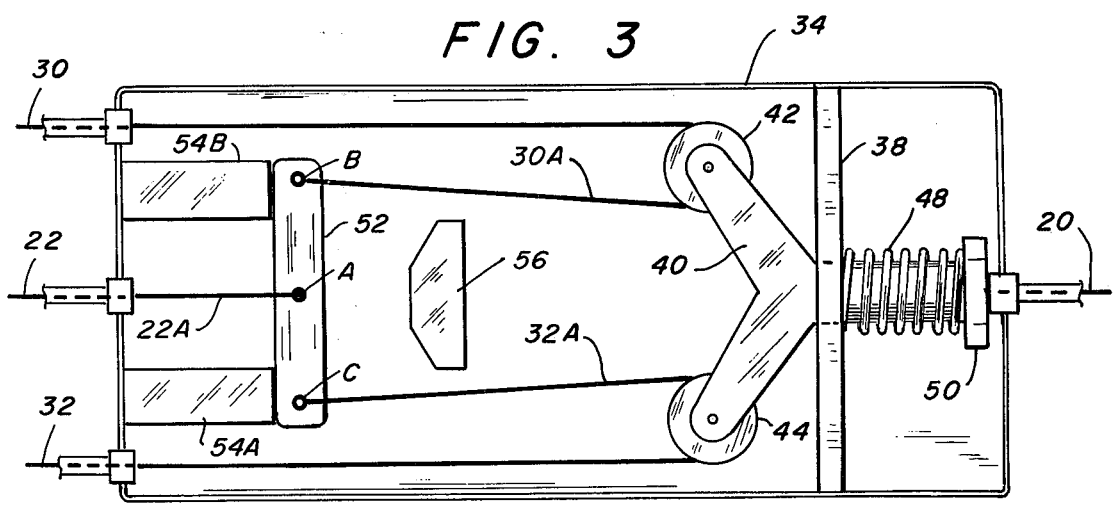
FIG. 3 is an alternate embodiment of the invention showing the housing with the cover removed.
Figure 4:
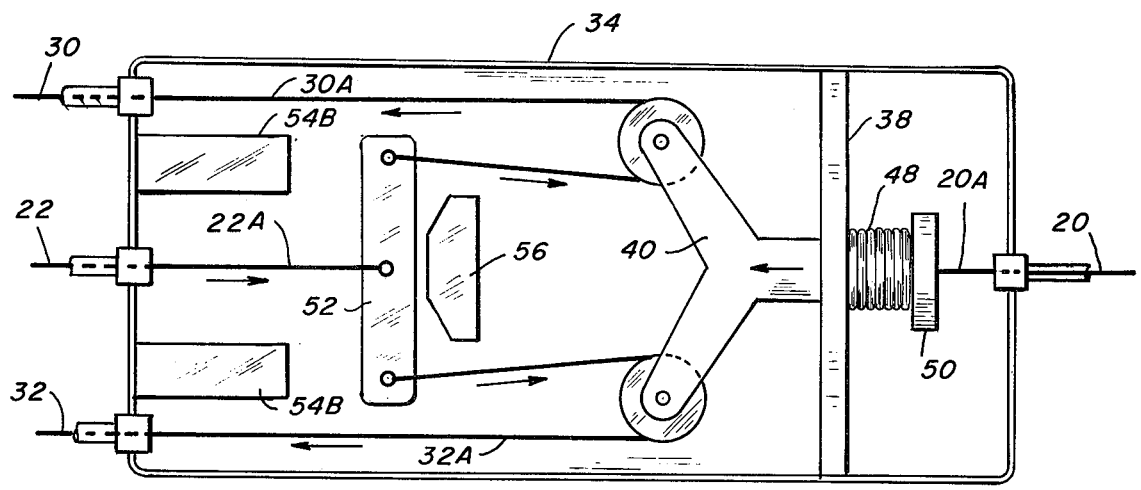
FIG. 4 is the embodiment of FIG. 3 showing the relationship of the parts with both brake levers cables withdrawn to apply both the front and rear brakes.
Figure 5:
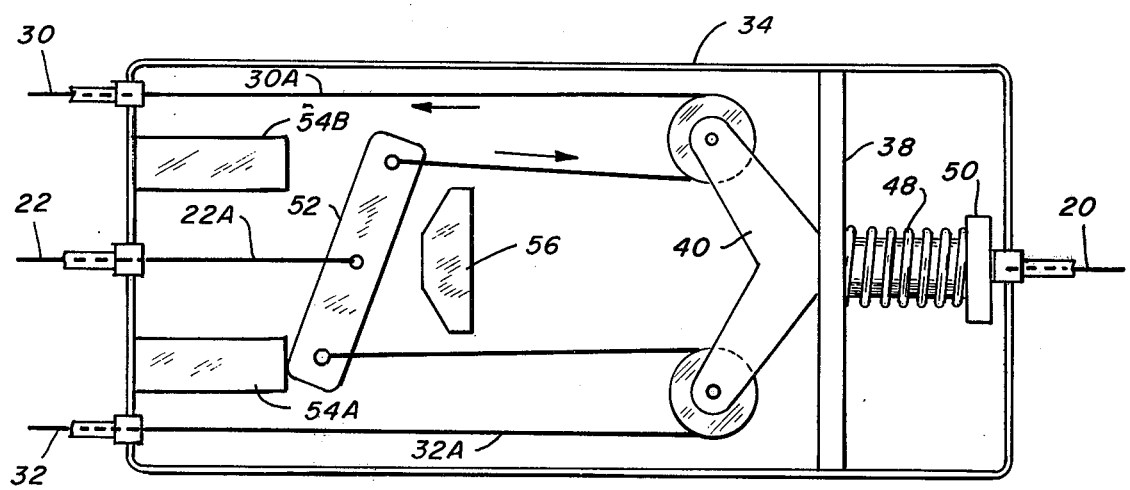
FIG. 5 shows the embodiment of FIG. 3 but with only one brake lever cable actuated.

FIGS. 3, 4 and 5 show an alternate embodiment of the invention. In this embodiment a rear brake bar 52 is utilized along with stops 54A and 54B. FIG. 3 shows the device in the position wherein no braking action is applied. The rear brake cable 22A attached to a midpoint A on bar 52 and the lever cables 30A and 32A attach to points B and C adjacent the opposed outer ends of the bar. FIG. 5 shows the condition in which the left lever is actuated to withdraw the left lever cable 30A. The lever 52 pivots about the stop 54A to withdraw the rear brake cable 22A in the direction indicated by the arrow to apply the rear brake. It can be seen that if the right brake lever is actuated withdrawing the right lever cable 32A the bar 50 would be pivoted in the opposite direction but nevertheless, moving the rear brake cable 22A to apply the rear brake. FIG. 4 shows the arrangement wherein both the left and right levers are actuated. The rear brake cable 22A is moved to its limit as the rear brake is fully applied. Thereafter, the front brake actuator 40 is slidably moved in the direction indicated by the arrow, compressing spring 48, and withdrawing front brake cable 20A to apply the front brakes.

A safety stop 56 is affixed to the housing adjacent the rear brake bar 52 and in the direction towards the front brake actuator 40. The function of the safety stop is to limit the forward motion of the lever in the event the rear brake cable 22A brakes. This would nevertheless cause the front brake actuator 40 to be moved forwardly to the position shown in FIG. 4 when the brake cables 30A and 32A are withdrawn, thus providing a safety feature for the device.

Figure 6:
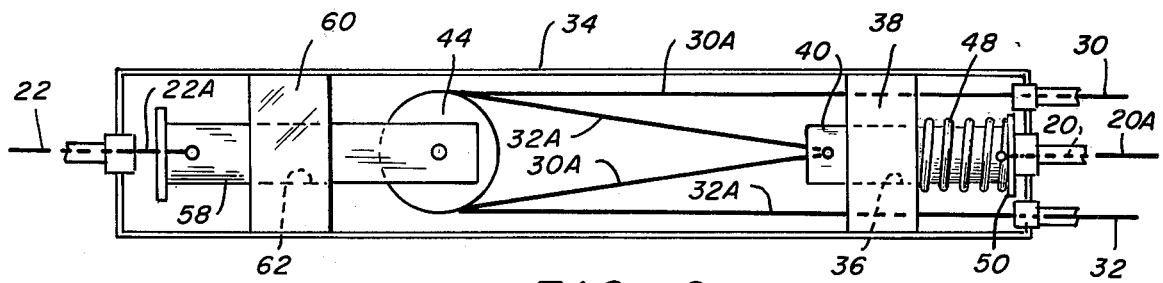
FIGS. 6 and 7 are an additional alternate embodiment wherein the housing is reduced in size, FIG. 6 showing a side view with one side of the housing open and FIG. 7 showing a top view with one side of the housing removed.
Figure 7:
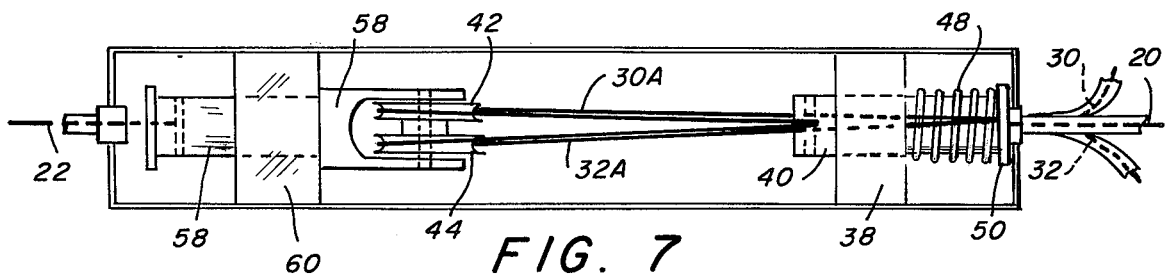

FIGS. 6 and 7 show a still different embodiment in which the housing structure is reduced in size. Both views show the relationship of the elements when either brake lever is actuated. Pulleys 42 and 44 are mounted side by side on a rear brake actuator 58 which is slidably positioned in a bearing block 60 located in the housing. The left lever cable 30A loops over pulley 44 and attaches to the front end of the front brake actuator 40. When either cable 30A or 32A is withdrawn by either the left or right hand levers, the rear brake actuator 58 is slidably moved through opening 62 in the bearing block 60 to withdraw the rear brake cable 22A and apply the rear brake. When the rear brake actuator 48 is moved to the maximum forward position as happens when the rear brake is fully applied, any further retractions of either the left or right hand lever cables 30A or 32A causes the front brake actuator 40 to overcome the force of compression spring 48 and to retract the front brake cable 20A.

All of the embodiments illustrated accomplish the same purpose in the same way. Each uses a front and rear brake actuator. In the embodiment of FIG. 2 the rear brake actuator is in the form of the rear brake pulley 44; in the embodiment of FIGS. 3, 4 and 5 the rear brake actuator is in the form of the rear brake bar 52; and in the embodiment of FIGS. 6 and 7 the rear brake actuator is the slidable element 58.

It can be seen that in the embodiment of FIGS. 6 and 7, the pulleys 42 and 44 could be mounted in the front brake actuator 40, in which case the sliding element 58 may be eliminated and the ends of cable 22A, 30A and 32A joined together. In this arrangement the junction of these three cables would be the rear brake actuator.

The invention has been described more or less diagrammatically and the actual mechanism which may be employed to accomplish the purpose of the invention may depart materially from the illustrations herein. It is understood that the illustrations are for the purposes of exemplifying the invention, including several alternate embodiments, but is not intended to disclose all the various arrangements which the invention may take.

It is understood that the invention is not to be limited by the embodiments which have been illustrated and described for purposes of exemplification, but is to be limited only by the scope of the attached claim or claims, including the full range of equivalency to which each element thereof is entitled.

What is claimed:

1. A safety brake device for bicycles having a right brake lever with a right lever cable extending therefrom which is drawn towards the lever when the lever is actuated, a left brake lever having a left lever cable extending therefrom which is drawn towards the lever when the lever is actuated, a front brake having a front brake cable extending therefrom, the front brake being actuated when the front brake cable is drawn away from the brake, and a rear brake having a rear brake cable extending therefrom, the rear brake being actuated when the rear brake cable is drawn away from the brake, the device comprising:

a housing supported to the bicycle having said right and left lever cables and said front and rear brake cables communicating therewith;

a front brake actuator movably supported in said housing, said front brake cable being connected to said front brake actuator, said front brake actuator being movable between a first position in which said front brake is not applied and a second position wherein said front brake cable is withdrawn to apply said front brake;

a rear brake actuator movably supported in said housing, said rear brake cable being connected to said rear brake actuator, said rear brake actuator being movable between a first position in which said rear brake is not applied and a second position wherein said rear brake cable is withdrawn to apply said rear brake;

two pulleys being rotatably affixed to one of said front and rear brake actuators, said right lever cable looping around one of said pulleys and the end thereof being affixed to the other of said actuators, and in like manner, the left lever cable being looped around the other pulley and attached to the other of said actuators; and means biasing said rear brake cable in preference to said front brake cable whereby said rear brake cable will be withdrawn towards said housing first when either said right or left brake lever is applied.

2. A safety brake mechanism according to claim 1 wherein said means of biasing said rear brake cable includes:

a comprssion spring between said housing and said front brake actuator whereby said spring must be compressed to withdraw said front brake cable towards said housing.

3. A safety brake device according to claim 1 wherein:

said rear brake actuator has a rear brake pulley thereon, and wherein said cables from said brake levers loop around said first mentioned pulleys mounted on said front brake actuator and are joined together and loop around said rear brake pulley.

4. A safety brake device according to claim 1 wherein:

said pair of pulleys are mounted on said front brake actuator and including:

a rear brake bar positioned within said housing, said rear brake cable being attached to the center of the bar, said left lever cable being attached to one end of the bar and said right lever cable being attached to the other end of the bar; and stop means within said housing adjacent each end of said bar permitting said bar to be pivoted in the direction towards either or both of said brake cables.

5. A safety brake device according to claim 4 including:

a safety stop member supported within said housing adjacent the center portion of said bar and in the direction from said bar towards said front brake actuator.

* * * * *